(12) United States Patent
Dolan

(10) Patent No.: US 8,571,313 B2
(45) Date of Patent: Oct. 29, 2013

(54) METHODS AND SYSTEMS FOR ESTIMATION OF DOCUMENT SKEW IN AN IMAGE

(75) Inventor: John E. Dolan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 891 days.

(21) Appl. No.: 12/729,128

(22) Filed: Mar. 22, 2010

(65) Prior Publication Data

US 2011/0228342 A1    Sep. 22, 2011

(51) Int. Cl.
*G06K 9/00*    (2006.01)

(52) U.S. Cl.
USPC .......... 382/168; 358/3.26; 382/289; 382/296; 382/297; 382/319

(58) Field of Classification Search
None
See application file for complete search history.

(56) References Cited

U.S. PATENT DOCUMENTS

| | | | |
|---|---|---|---|
| 5,528,387 A | 6/1996 | Kelly et al. |
| 5,796,877 A | 8/1998 | Gusmano |
| 5,870,508 A | 2/1999 | Park |
| 5,901,253 A | 5/1999 | Tretter |
| 6,298,157 B1 | 10/2001 | Wilensky |
| 6,310,984 B2 | 10/2001 | Sansom-Wai et al. |
| 6,360,026 B1 | 3/2002 | Kulkarni et al. |
| 6,430,320 B1 | 8/2002 | Jia et al. |
| 6,456,732 B1 | 9/2002 | Kimbell et al. |
| 6,560,376 B2 | 5/2003 | Kimbell et al. |
| 6,956,587 B1 | 10/2005 | Anson |
| 6,987,880 B2 | 1/2006 | Dolan et al. |
| 7,027,666 B2 | 4/2006 | Rudak et al. |
| 7,068,855 B2 | 6/2006 | Simske et al. |
| 7,305,146 B2 | 12/2007 | Cheatle |
| 7,474,804 B2 | 1/2009 | Yang |
| 2003/0026473 A1 | 2/2003 | Lee et al. |

FOREIGN PATENT DOCUMENTS

| | | |
|---|---|---|
| EP | 0883287 A1 | 12/1998 |
| JP | 10276316 A | 10/1998 |
| JP | 11288453 A | 10/1999 |

*Primary Examiner* — Twyler Haskins
*Assistant Examiner* — Christopher D Wait
(74) *Attorney, Agent, or Firm* — Kristine Elizabeth Matthews; David C. Ripma

(57) ABSTRACT

Aspects of the present invention are related to systems and methods for determining a skew angle associated with a document image. According to a first aspect of the present invention, a rotation vector may be estimated for at least one layer in a vertical-edge buffer and a horizontal-edge buffer. According to a second aspect of the present invention, a rotation vector may be estimated directly from the vertical-edge buffer and the horizontal-edge buffer using a fixed-sized, progressively constrained histogram.

7 Claims, 8 Drawing Sheets

METHODS AND SYSTEMS FOR ESTIMATION OF DOCUMENT SKEW IN AN IMAGE

RELATED REFERENCES

U.S. Pat. No. 6,987,880, entitled "Efficient Document Boundary Determination," is hereby incorporated by reference herein in its entirety.

FIELD OF THE INVENTION

Embodiments of the present invention relate generally to image processing and, in particular, to methods and systems for determination of document skew in an image.

BACKGROUND

When a document is placed on a scanner platen, the document may be placed at an angle relative to the direction of the scan. In this situation, the document content may be skewed, also considered rotated, in the scanned document page, also considered the document image or the image. Document-content skew may also arise when a document is scanned using an automatic document feeder. Additionally, content in an image may appear skewed relative to the image boundaries due to document layout attributes. That is, content may be rotated relative to an image boundary for stylistic or other reasons.

An accurate estimate of a skew angle associated with a document image may be required for many reasons. For example, some image-processing techniques may require accurately determined content boundaries for which knowledge of the document skew angle may be necessary. Furthermore, a scanning system that supports automatic skew detection and skew-angle determination may be desirable since they may be crucial to the scanning system's ability to automatically handle an arbitrarily placed document. Efficient skew estimation may be desirable for devices with limited computational resources.

SUMMARY

Some embodiments of the present invention comprise methods and systems for determining a rotation vector associated with a skew angle, of a scanned document, relative to the direction of the scan.

Some embodiments of the present invention may comprise a skew-determination system, wherein edge buffers may be generated from a normalized input image and the edge buffers may be processed by a layer processor for determination of a rotation vector associated with each layer in a layer set.

Alternative embodiments of the present invention may comprise a skew-determination system, wherein edge buffers may be generated from a normalized input image and the edge buffers may be processed directly by a constrained-histogram generator to determine a rotation vector.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

When a document is placed on a scanner platen, the document may be placed at an angle relative to the direction of the scan. In this situation, the document content may be skewed, also considered rotated, in the scanned document page, also considered the document image or the image. Document-content skew may also arise when a document is scanned using an automatic document feeder. Additionally, content in an image may appear skewed relative to the image boundaries due to document layout attributes. That is, content may be rotated relative to an image boundary for stylistic or other reasons.

An accurate estimate of a skew angle associated with a document image may be required for many reasons. For example, some image-processing techniques may require accurately determined content boundaries for which knowledge of the document skew angle may be necessary. Furthermore, a scanning system that supports automatic skew detection and skew-angle determination may be desirable since they may be crucial to the scanning system's ability to automatically handle an arbitrarily placed document. Efficient skew estimation may be desirable for devices with limited computational resources.

Embodiments of the present invention comprise methods and systems for skew-angle determination, also referred to as skew determination, by page-content analysis.

Figure 1:
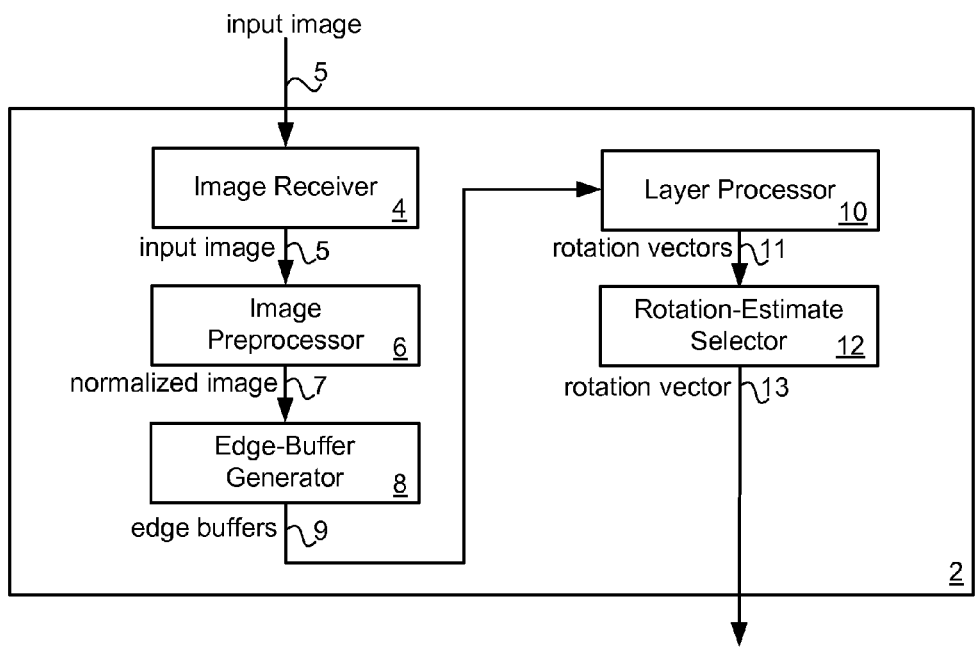
FIG. 1 is a picture showing exemplary embodiments of the present invention comprising a skew-determination system, wherein edge buffers may be generated from a normalized input image and the edge buffers may be processed by a layer processor for determination of a rotation vector associated with each layer in a layer set.

Referring to FIG. 1, in some embodiments of the present invention, an input image 5 may be made available to a skew-determination system 2 for skew-angle determination. In some embodiments of the present invention, the skew-determination system 2 may reside in an imaging device, for example, a scanner, a multifunction peripheral (MFP), a copier or other imaging device. In alternative embodiments, the skew-determination system 2 may reside in a computing device. In yet alternative embodiments, the skew-determination system 2 may comprise multiple devices, which may, or may not, be located proximate to each other. In some embodiments of the present invention, the skew-determination system 2 may comprise a computer program product stored on a computer-readable storage device and a computer processor for processing the computer program product.

The input image 5 may be received at an image receiver 4 in the skew-determination system 2. The image receiver 4 may make the input image 5 available to an image preprocessor 6, which may preprocess the input image 5 to a normalized form. In alternative embodiments of the present invention, a normalized image may be received directly in a skew-determination system. The normalized image 7 may be made available to an edge-buffer generator 8, which may generate a horizontal-strip edge buffer and a vertical-strip edge buffer 9. The edge buffers 9 may be made available to a layer processor 10, which may estimate a rotation vector 11 for at least one layer associated with the edge buffers 9. The estimated rotation vectors 11 may be made available to a rotation-estimate selector 12, which may select a rotation vector 13 from the estimated rotation vectors 11, which may be referred to as a group of estimated rotation vectors or a group of rotation vectors, associated with the, at least one, layers. The selected rotation vector 13 may be made available to additional processes or systems by the skew-determination system 2.

A rotation vector may be characteristic of a skew angle. In some embodiments of the present invention, a rotation vector may comprise a baseline value, which may be denoted β, and an associated delta, which may be denoted Δ, which may relate to a skew angle, which may be denoted θ, according to:

$$\theta = \arctan\left(\frac{\Delta}{\beta}\right).$$

In some embodiments of the present invention, the image preprocessor 6 may comprise a down-sampler and a converter. The input image 5 may comprise a high-resolution image, for example, a 300 dpi (dots per inch) image, and the high-resolution, input image may be down-sampled to a lower resolution, for example, 75 dpi. The resolution to which the input image 5 may be down-sampled may be associated with, in some embodiments, the computational capability of the skew-determination system 2. The down-sampled data may be converted to grayscale data, if necessary. For example, if the input image 5 is an RGB (red-green-blue) image, then an RGB-to-Y conversion, or other color-to-grayscale conversion known in the art, may be applied. In some embodiments, a ceiling on the grayscale values may be imposed. In some of these embodiments, all grayscale values greater than a threshold value may be clamped to the threshold value. An exemplary threshold value for 8-bit grayscale data may be 235. In alternative embodiments, an input image 5 may be converted to grayscale data first, and then down-sampled. The converted and down-sampled input image may be referred to as the normalized image 7 corresponding to the input image 5.

Figure 2:
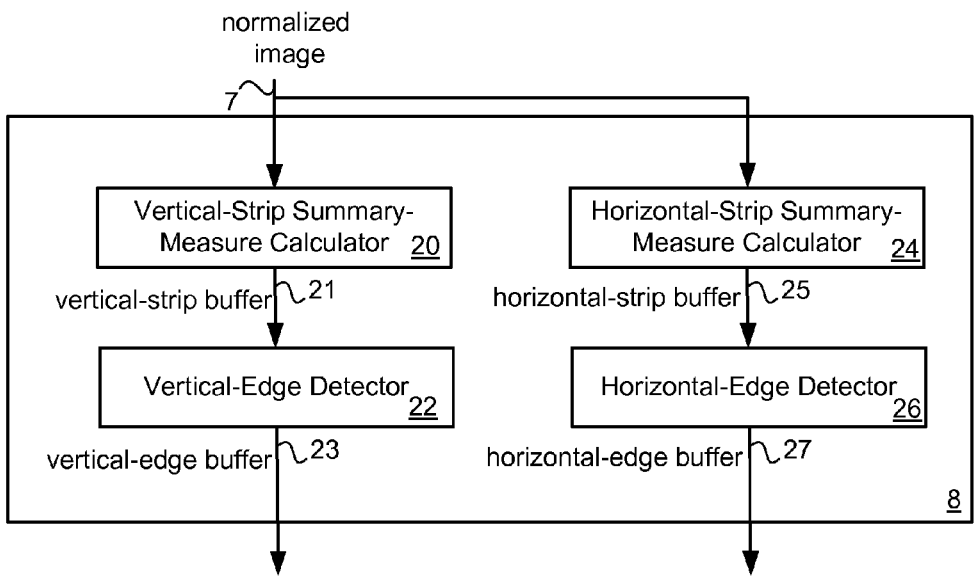
FIG. 2 is a picture showing exemplary embodiments of the present invention comprising an edge-buffer generator, wherein a horizontal-strip edge buffer and a vertical-strip edge buffer may be generated by a horizontal-edge detector and a vertical-edge detector, respectively, operating on a horizontal-strip buffer and a vertical-strip buffer, respectively.

The normalized image 7 may be made available from the image preprocessor 6 to an edge-buffer generator 8. The edge-buffer generator 8 may generate a horizontal-strip edge buffer and a vertical-strip edge buffer, which may be collectively referred to as the edge buffers, 9. In some embodiments described in relation to FIG. 2, the edge-buffer generator 8 may comprise a vertical-strip summary-measure calculator 20 and a horizontal-strip summary-measure calculator 24, which may generate a vertical-strip buffer 21 and a horizontal-strip buffer 25, respectively.

Figure 3:
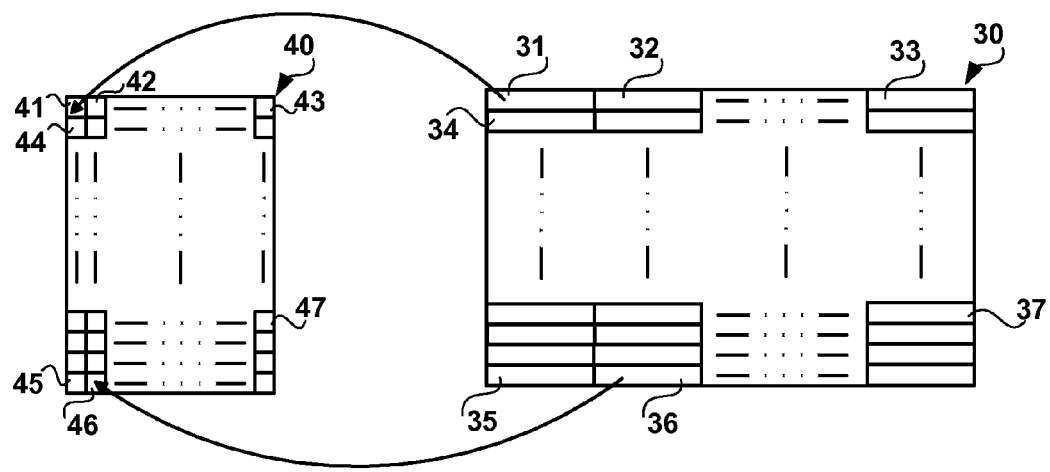
FIG. 3 is a picture depicting an exemplary partitioning of a normalized image into non-overlapping horizontal strips of pixels and an associated horizontal-strip buffer comprising a summary measure of each non-overlapping horizontal strip of pixels.

Referring to FIG. 3, a normalized image 30 may be partitioned into non-overlapping 1-by-k blocks, also considered horizontal strips, of pixels, for example, seven of which 31-37 are shown labeled in FIG. 3. A summary measure may be calculated for each horizontal strip by the horizontal-strip summary-measure calculator 24. A horizontal-strip buffer 40 may be generated and the summary measures corresponding to each horizontal strip, for example, 41-47 corresponding to 31-37, respectively, may be stored. Exemplary widths of the horizontal strips may be 8 pixels, 16 pixels and 32 pixels. In some embodiments of the present invention, the summary measure for a horizontal strip may be the mean value of the pixel values in the horizontal strip.

Figure 4:
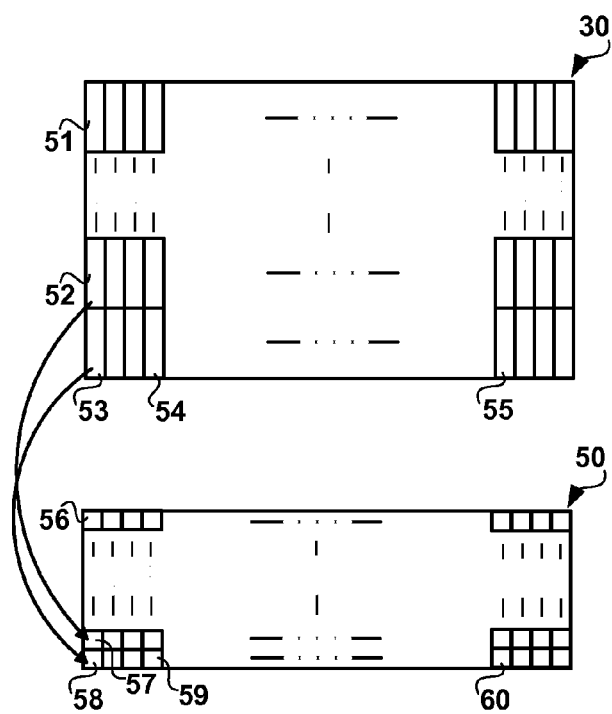
FIG. 4 is a picture depicting an exemplary partitioning of a normalized image into non-overlapping vertical strips of pixels and an associated vertical-strip buffer comprising a summary measure of each non-overlapping vertical strip of pixels.

Similarly, referring to FIG. 4, a normalized image 30 may be partitioned into non-overlapping k-by-1 blocks, also considered vertical strips, of pixels, for example, five of which 51-55 are shown labeled in FIG. 4. A summary measure may be calculated for each vertical strip by the vertical-strip summary-measure calculator 20. A vertical-strip buffer 50 may be generated and the summary measures corresponding to each vertical strip, for example, 56-60 corresponding to 51-55, respectively, may be stored. Exemplary heights of the vertical strips may be 8 pixels, 16 pixels and 32 pixels. In some embodiments of the present invention, the summary measure for a vertical strip may be the mean value of the pixel values in the vertical strip.

Referring again to FIG. 2, a vertical-edge detector 22 and a horizontal-edge detector 26 may be applied to the vertical-strip buffer 21 and the horizontal-strip buffer 25, respectively. In some embodiments of the present invention, the edge detectors 22, 26 may comprise local differencing and thresholding. In an exemplary embodiment, the vertical-edge buffer 23, which may be denoted $E_{r,c}^V$, may be generated according to:

$$E_{r,c}^V = \begin{cases} 1, & |B_{r,c}^V \otimes D^V| > \theta_V \\ 0, & \text{otherwise,} \end{cases}$$

and the horizontal-edge buffer 27, which may be denoted $E_{r,c}^H$, may be generated according to:

$$E_{r,c}^H = \begin{cases} 1, & |B_{r,c}^H \otimes D^H| > \theta_H \\ 0, & \text{otherwise,} \end{cases}$$

where r, c designates the row and column position within a buffer, $B_{r,c}^V$ and $B_{r,c}^H$ denote the vertical-strip buffer and the horizontal-strip buffer, respectively, $D^V$ denotes the vertical convolution kernel $[-1\ 1]$, $D^H$ denotes the horizontal convolution kernel $[-1\ 1]^T$, $\theta_V$ and $\theta_H$ denote a vertical-buffer threshold value and a horizontal-buffer threshold value, respectively, and $\otimes$ denotes convolution. In some embodiments, $\theta_V = \theta_H$, and in some of these embodiments, $\theta_V = \theta_H = 3$.

Referring again to FIG. 1, the layer processor 10 may estimate a rotation vector for at least one layer. The first layer of a vertical-edge buffer is the location of the first non-zero entry, from the left and the right, in each row. If a row contains no edges, then a null-edge marker, indicating that the row contains no edges, may be associated with the row. The first layer of a horizontal-edge buffer is the location of the first non-zero entry, from the top and the bottom, in each column. A null-edge marker may be associated with any column that does not contain an edge. The first layer may be viewed as the outermost edges in each of the two orthogonal directions defining the image coordinates, that is, the top, bottom, left and right. A subsequent layer may be determined by replacing all locations corresponding to previous layers with a zero.

Figure 5:
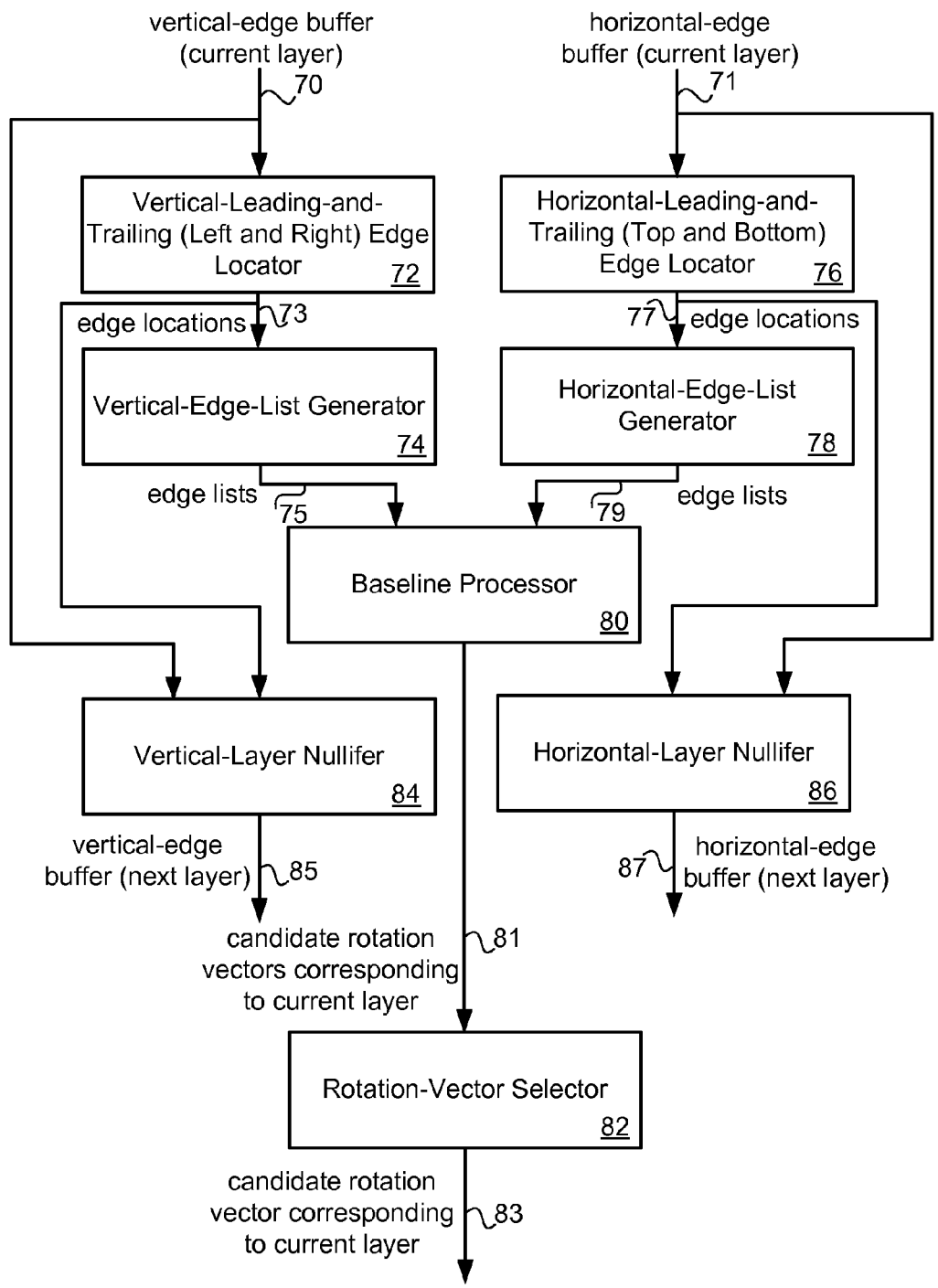
FIG. 5 is a picture showing exemplary embodiments of the present invention comprising a layer processor, wherein the layer processor may process, for each layer in a layer set, a vertical-edge buffer layer and a horizontal-edge buffer layer.

An exemplary layer processor may be described in relation to FIG. 5. In these embodiments, the layer processor may make, for each of M layers, $\lambda_i$, in a layer set which may be denoted $\Lambda = [\lambda_1, \lambda_2, \ldots, \lambda_M]$, the vertical-edge buffer 70 associated with the current layer available to a vertical-leading-and-trailing edge locator 72 and the horizontal-edge buffer 71 associated with the current layer available to a horizontal-leading-and-trailing edge locator 76. The vertical leading and vertical trailing edges are the left and right edges, respectively, and the horizontal leading and horizontal trailing edges are the top and bottom edges, respectively. The vertical-leading-and-trailing edge locator 72 may determine the edge locations 73 of the leading and trailing edges in the current vertical-edge buffer 70 by examining the rows in the current vertical-edge buffer 70 independently, and the horizontal-leading-and-trailing edge locator 76 may determine the edge locations 77 of the leading and trailing edges in the current horizontal-edge buffer 71 by examining the columns in the current horizontal-edge buffer 71 independently.

Exemplary layer sets include $\Lambda_1 = [1]$, $\Lambda_2 = [1, 3]$ and $\Lambda_3 = [1, 3, 5]$.

Figure 6:
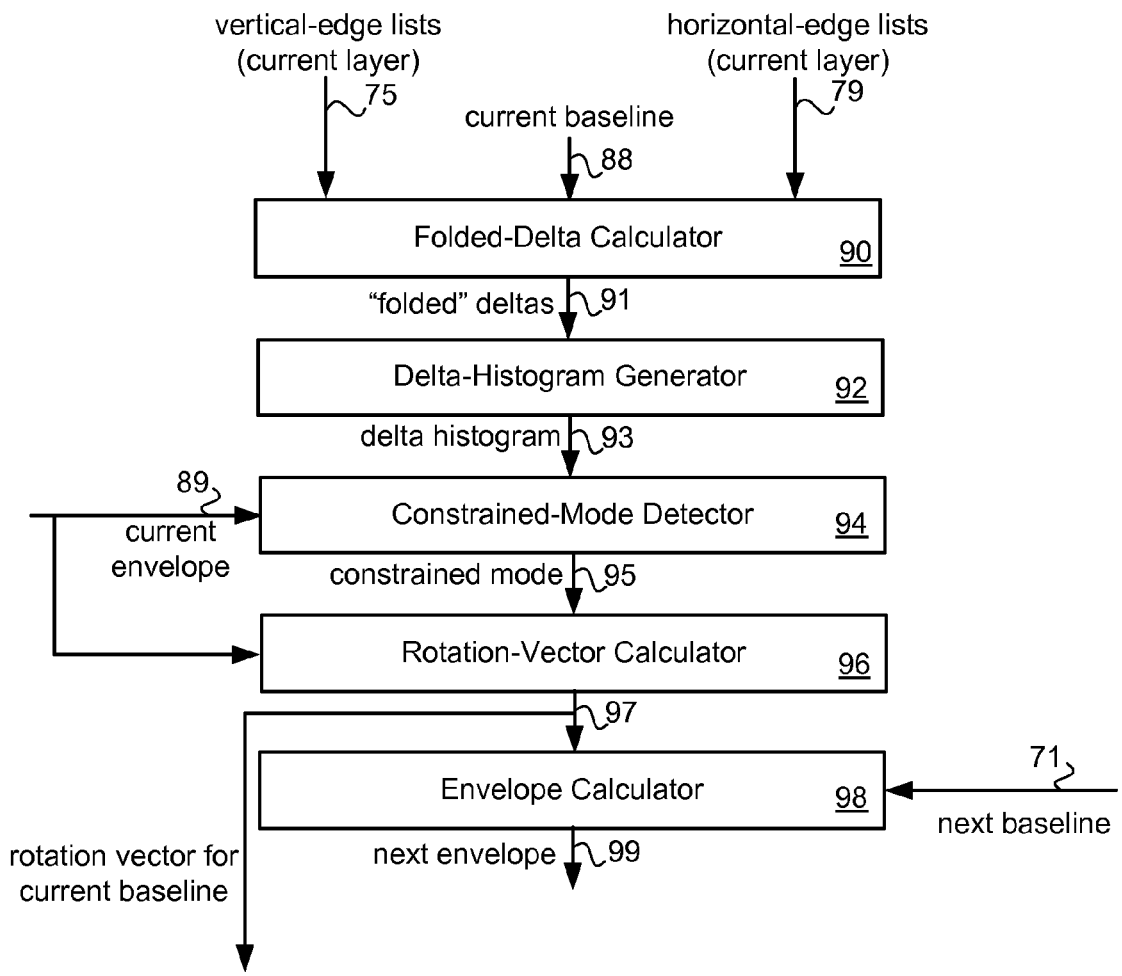
FIG. 6 is a picture showing exemplary embodiments of the present invention comprising a baseline processor, wherein the baseline processor may compute, for a current layer, a candidate rotation angle for each baseline, $\beta_i$, in an estimating set of baselines $\beta=[\beta_1, \beta_2, \ldots, \beta_N]$.

A vertical-edge-list generator 74 may generate two lists: a left list containing the column indices of the first edge, from the left, in each row or the null-edge index if there is no edge in a row; and a right list containing the column indices of the last edge, from the left, in each row or the null-edge index when no edge is present in a row. The horizontal-edge-list generator 78 may generate two lists: a top list containing the row indices of the first edge, from the top, in each column or the null-edge index if there is no edge in a column; and a bottom list containing the row indices of the last edge, from the top, in each column or the null-edge index if there is no edge in a column The edge lists 75, 79 generated by the vertical-edge-list generator 74 and the horizontal-edge-list generator 78 may be made available to a baseline processor 80. The baseline processor 80 may be understood in relation to FIG. 6.

The baseline processor 80 may compute, for the current layer, a candidate rotation angle for each baseline, $\beta_i$, in an estimating set of baselines which may be denoted $B = [\beta_1, \beta_2, \ldots, \beta_N]$. In an exemplary embodiment, the set of baselines may be $B = [32, 64, 128, 256, 512, 576]$, which allows for the resolution of angles as small as 0.1°. For each baseline, the baseline processor 80 may make available, to a folded-delta calculator 90, the current-layer vertical-edge lists 75 (left, right), the current-layer horizontal-edge lists 79 (top, bottom) and the current baseline 88. The folded-delta calculator 90 may compute "folded" deltas 91 for each current leading-trailing set. The term "folded" is used to indicate that the angle estimates are constrained to the interval $[-45°, 45°]$. The baseline may be considered the x component of a tangent vector associated with a rotation angle, and a measured delta may be considered the y component of the tangent. The delta may be the local displacement from the local baseline. The folded-delta calculator 90 may traverse an edge list, for example, a left-edge list, also referred to as a left list, a right-edge list, also referred to as a right list, a top-edge list, also referred to as a top list, and a bottom-edge list, also referred to as a bottom list, element-by-element using the current baseline value. When a non-null edge coordinate is encountered, the edge list may be checked at an offset of the current baseline value to determine if a valid edge is present at that position. If a valid edge is present at that position, the signed difference in the coordinates may be the local delta. The coordinate of the current position may be subtracted from the coordinate at the baseline offset where the valid edge is detected. When a null-edge index is encountered at either end of the baseline, no delta is calculated at that position.

Figure 7:
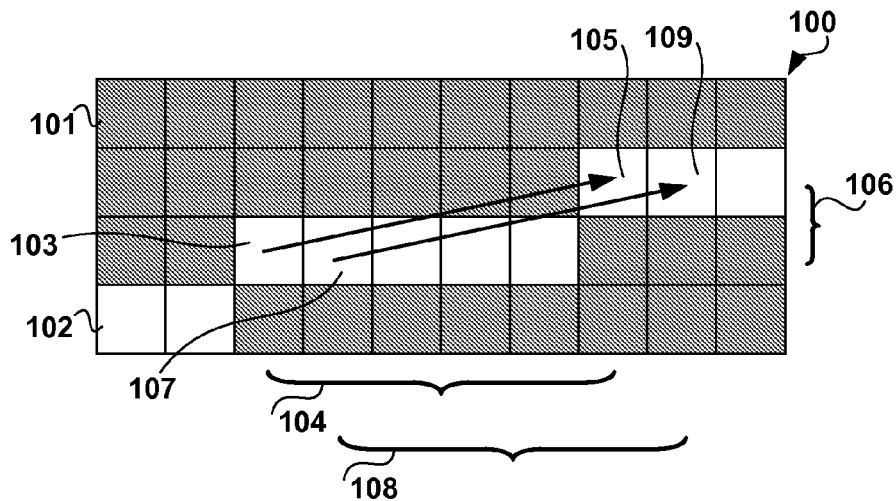
FIG. 7 is a picture illustrating a baseline-delta relationship according to embodiments of the present invention for an exemplary horizontal-edge buffer.

FIG. 7 illustrates the relationship for the delta determination. FIG. 7 depicts a portion 100 of an exemplary horizontal-edge buffer. The non-edge pixels are indicated in gray, for example, 101. The edge pixels are indicated in white, for example 102. An edge list corresponding to the horizontal-edge buffer would list, for each column, the row in which the edge is positioned. For a current baseline length, as shown 104, 108, when the edge list entry corresponding to edge location 103 is examined, the edge list entry at an offset corresponding to the current baseline 104 is then examined to determine if a valid edge exists at that offset. The entry in the edge list at that offset will correspond to edge location 105, and the delta 106 may be determined by examining the relative difference between the corresponding edge-list entries. Similarly, when the edge list entry corresponding to edge location 107 is examined, the edge list entry at an offset corresponding to the current baseline 108 may be then examined to determine if a valid edge exists at that offset. The entry in the edge list at that offset will correspond to edge location 109, and the delta 106 may be determined by examining the relative difference between the corresponding edge-list entries When a local delta is larger than the current baseline, the angle magnitude is greater than 45°, and a folding operation may be performed. The folding operation may be illustrated pictorially in relation to FIG. 8. The solid black line 110 represents (in image coordinates) edge locations in an edge buffer, in this example, a horizontal edge buffer. When the edge point at location 112 is examined, a determination may be made as to whether or not an edge point is present at an orthogonal offset to the current baseline 113. In this example, an edge point 114 is located at an offset distance of Δ1 115. Since Δ1 115 is less than the length of the current baseline 113, the offset distance, Δ1 115, is recorded.

Figure 8:
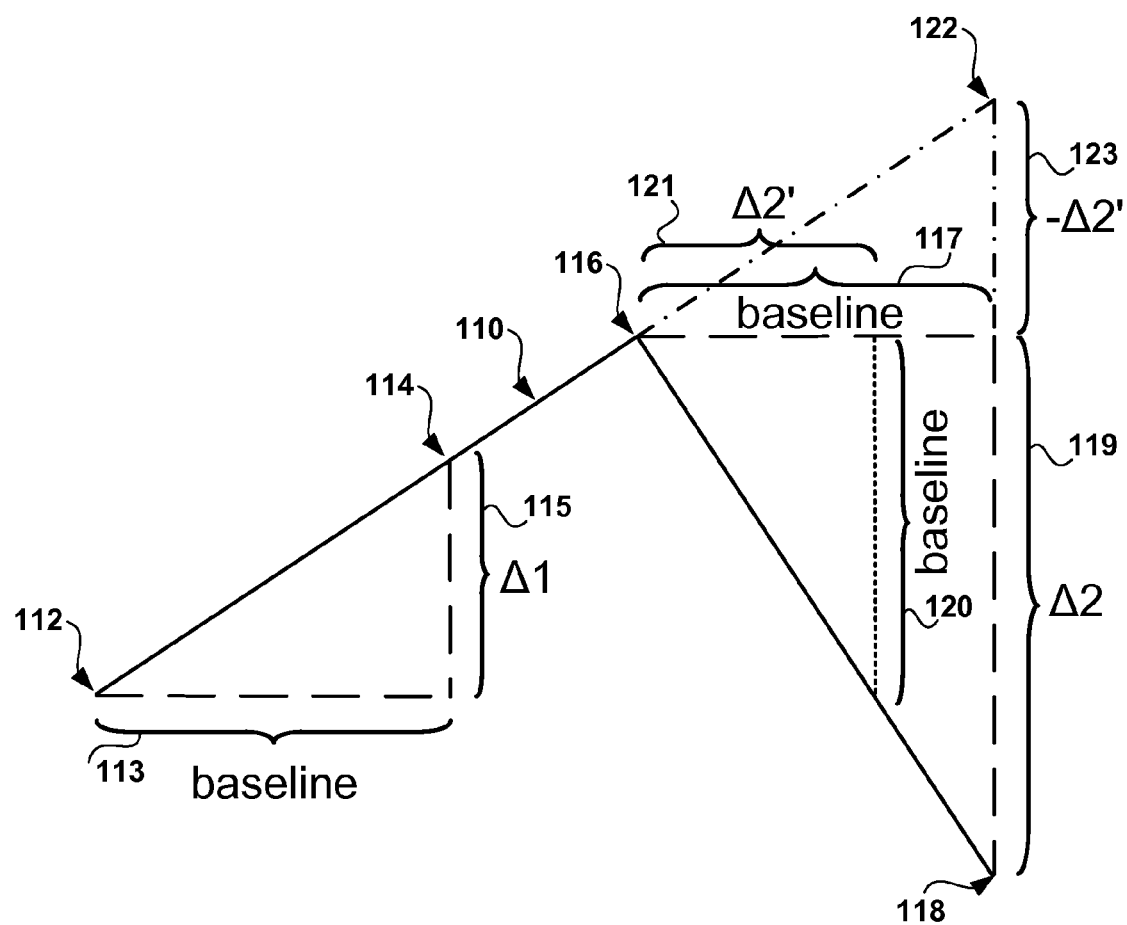
FIG. 8 is a picture illustrating a folding operation, according to embodiments of the present invention, for delta determination for angle magnitudes greater than 45°.

However, considering the edge point at location 116, the edge point 118 is located at an offset Δ2 119 from the baseline 117. In this example, Δ2 119 is greater than the length of the current baseline 117. Therefore, the cotangent is representative of the rotation angle constrained to the interval [45°, 45°]. In order to consistently associate the offset with the current baseline 117, the offset Δ2 119 needs to be rescaled to the baseline length 120 so that the appropriate offset Δ2' 121 may be recorded. By exploiting similar triangles, it is readily seen that $$\Delta 2' = \frac{-\beta^2}{\Delta 2},$$

where β is the length of the current baseline. Flipping the sign of Δ2' 121 gives an offset 123 consistent with the other deltas associated with the current baseline. As seen in FIG. 8, this is, effectively, a folding of the point 118 which brings the rotation angle within the constraint.

Referring again to FIG. 6, the deltas 91 determined by processing each of the four edge lists may be accumulated by a delta-histogram generator 92 to form a delta histogram 93. The delta histogram 93 may comprise $2\beta_i+1$ bins, where $\beta_i$ is the length of the current baseline and the bins may be mapped to the closed integer interval $[-\beta_i, \beta_i]$.

The delta histogram 93 may be made available to a constrained-mode detector 94 which may determine, using any of the many know-in-the-art peak detection methods, the peak within a current envelope 89 expressing a lower-bound upper-bound pair of bin indices, which may be denoted $[lb_i, ub_i]$. This peak may be referred to as the constrained mode 95 and may be determined in some embodiments, by determining the bin index, within the current envelope 89, that has maximum count. Initially, for the first baseline length, the envelope may encompass the entire histogram. Thereafter, it may be constrained by the current rotation estimate 97 projected to the scale of the next baseline.

The constrained mode 95 may be made available to a rotation-vector calculator 96, which may determine a rotation vector 97 associated with the current baseline 88. For a baseline iteration, i, and a mode index, denoted $mdindex_i$, the rotation vector 97 may be given by $[\beta_i, \Delta_i]$, where $\Delta_i = bincenters_i(lb_i + mdindex_i - 1)$ and $bincenters_i$ maps the histogram bin centers to displacement values. The calculated rotation vector 97 may be made available to an envelope calculator 98 that calculates the envelope for the next baseline iteration, and the rotation vector 97 may be recorded for the current baseline.

The envelope calculator 98 may compute the next envelope 99 for the next baseline iteration, i+1. The bin index of the center of the next envelope 99, which may be denoted $ec_{i+1}$, may be computed by mapping the current delta estimate, $\Delta_i$, into the histogram range of the next iteration according to:

$$ec_{i+1} = s \cdot \Delta_i + \beta_{i+1} + 1,$$

where $$s = \frac{\beta_{i+1}}{\beta_i}.$$

In some embodiments of the present invention, the envelope interval may be determined according:

$$lb_{i+1} = \max(ec_{i+1} - n, mnind_{i+1})$$

and $$ub_{i+1} = \min(ec_{i+1} + n, mxind_{i+1}),$$

where $mnind_{i+1}$ and $mxind_{i+1}$ are the first and list bins, respectively, of the histogram range for the next iteration, and the max and min functions constrain the envelope to a valid histogram range. In some embodiments of the present invention, n=2.

Referring again to FIG. 5, from the rotation-vector estimates for all baselines 81 at a given layer, a most-likely rotation vector 83, also referred to as a candidate rotation vector corresponding to the current layer, may be selected for the current layer by a rotation-vector selector 82. In some embodiments, the estimate that is most precise and most likely may be selected. In some embodiments, the rotation-vector selector 82 may scale the estimates for all baseline iterations to the maximum baseline for comparison. A mean of the scaled estimates may be computed, and if the difference between the mean and the final (most precise) estimate is less than threshold, then the final vector may be selected as the best estimate. Otherwise, the mean may be selected as the best estimate. In alternative embodiments, the final, most precise estimate may be selected by the rotation-vector selector 82 as the candidate rotation vector 83 corresponding to the current layer. In still alternative embodiments of the present invention, the rotation-vector selector 82 may select the mode of the scaled estimates as the candidate rotation vector 83 corresponding to the current layer. In yet alternative embodiments, a weighted average of the scaled estimates may be selected as the candidate rotation vector 83 corresponding to the current layer. In some of these embodiments, a weight associated with a scaled estimate may be based on the length of the associated baseline.

The current layer, and any intervening layers to the next layer in the layer set, may be nullified by a vertical-layer nullifier 84 and a horizontal-layer nullifier 86. The vertical-edge buffer 85 for the next layer and the horizontal-edge buffer 87 for the next layer may be processed by the layer processor 10.

Referring to FIG. 1, from the rotation-vector estimates 11 for all layers, a final rotation-vector estimate 13 may be determined by a rotation-estimate selector 12. In some embodiments, a weighted mean of the rotation-vectors estimates 11 from the layers may be determined according to:

$$R = \frac{\sum_{\lambda \in \Lambda} r_\lambda w_\lambda}{\sum_{\lambda \in \Lambda} w_\lambda},$$

where $w_\lambda = e^{1/\lambda}$ and $r_\lambda$ is a rotation vector associated with a layer λ in the layer set Λ.

Figure 9:
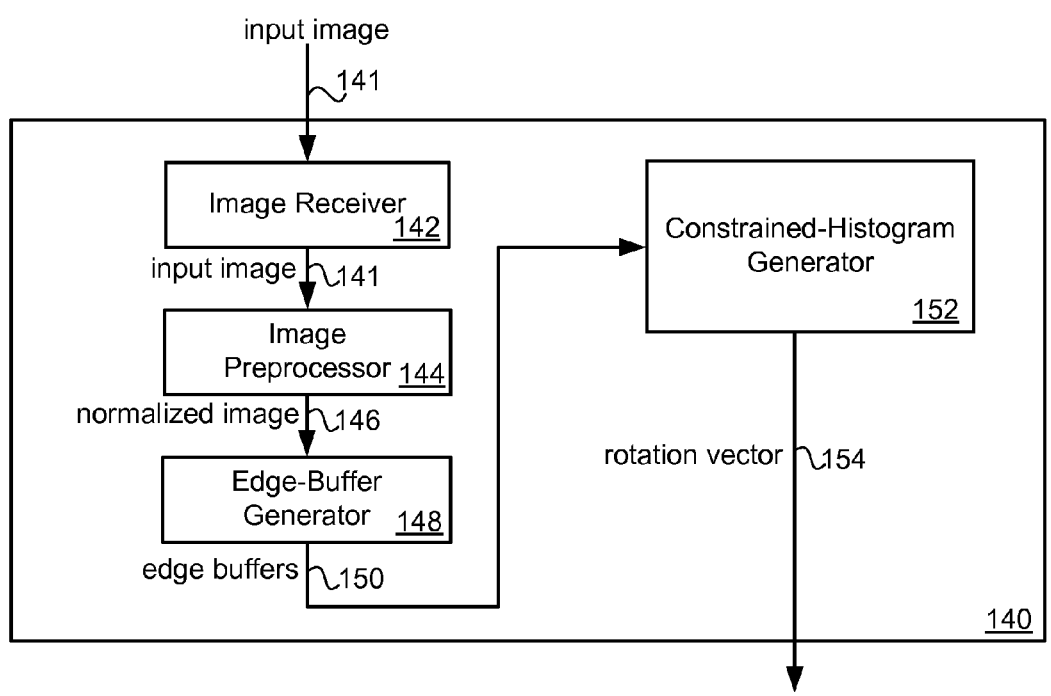
FIG. 9 is a picture showing exemplary embodiments of the present invention comprising a skew-determination system, wherein edge buffers may be generated from a normalized input image and the edge buffers may be processed directly by a constrained-histogram generator to determine a rotation vector.

In alternative embodiments of the present invention, a vertical-edge buffer and a horizontal-edge buffer may be processed directly. These embodiments may be understood in relation to FIG. 9. In some embodiments of the present invention, an input image 141 may be made available to a skew-determination system 140 for skew-angle determination. In some embodiments of the present invention, the skew-determination system 140 may reside in an imaging device, for example, a scanner, a multifunction peripheral (MFP), a copier or other imaging device. In alternative embodiments, the skew-determination system 140 may reside in a computing device. In yet alternative embodiments, the skew-determination system 140 may comprise multiple devices, which may, or may not, be located proximate to each other. In some embodiments of the present invention, the skew-determination system 140 may comprise a computer program product stored on a computer-readable storage device and a computer processor for processing the computer program product.

The input image 141 may be received at an image receiver 142 in the skew-determination system 140. The image receiver 142 may make the input image 141 available to an image preprocessor 144, which may preprocess the input image 141 to a normalized form. In alternative embodiments of the present invention, a normalized image may be received directly in a skew-determination system. The normalized image 146 may be made available to an edge-buffer generator 148, which may generate a horizontal-strip edge buffer and a vertical-strip edge buffer, which may be referred to collectively as edge buffers, 150. The edge buffers 150 may be made available to a constrained-histogram generator 152, which may estimate a rotation vector 154 by computing entries, in progressively constrained histograms, for each edge point in the edge buffers 150 using a sequence of baselines. The estimated rotation vector 154 may be made available to additional processes or systems by the skew-determination system 140.

A rotation vector may be characteristic of a skew angle. In some embodiments of the present invention, a rotation vector may comprise a baseline value, which may be denoted β, and an associated delta, which may be denoted Δ, which may relate to a skew angle, which may be denoted θ, according to:

$$\theta = \arctan\left(\frac{\Delta}{\beta}\right).$$

In some embodiments of the present invention, the image preprocessor 144 may comprise a down-sampler and a converter. The input image 141 may comprise a high-resolution image, for example, a 300 dpi (dots per inch) image, and the high-resolution, input image may be down-sampled to a lower resolution, for example, 75 dpi. The resolution to which the input image 141 may be down-sampled may be associated with the computational capability of the skew-determination system 140. The down-sampled data may be converted to grayscale data, if necessary. For example, if the input image 141 is an RGB (red-green-blue) image, then an RGB-to-Y conversion, or other color-to-grayscale conversion known in the art, may be applied. In some embodiments, a ceiling on the grayscale values may be imposed. In some of these embodiments, all grayscale values greater than a threshold value may be clamped to the threshold value. An exemplary threshold value for 8-bit grayscale data may be 235. In alternative embodiments, an input image 141 may be converted to grayscale data first, and then down-sampled. The converted and down-sampled input image may be referred to as the normalized image 146 corresponding to the input image 141.

The normalized image 146 may be made available from the image preprocessor 144 to an edge-buffer generator 148. The edge-buffer generator 148 may generate, as described in relation to the embodiments described in relation to FIG. 1, a horizontal-strip edge buffer and a vertical-strip edge buffer 150. In some embodiments, the edge-buffer generator 148 may comprise, as described above, a vertical-strip summary-measure calculator and a horizontal-strip summary-measure calculator, which may generate a vertical-strip buffer and a horizontal-strip buffer, respectively.

Figure 10:
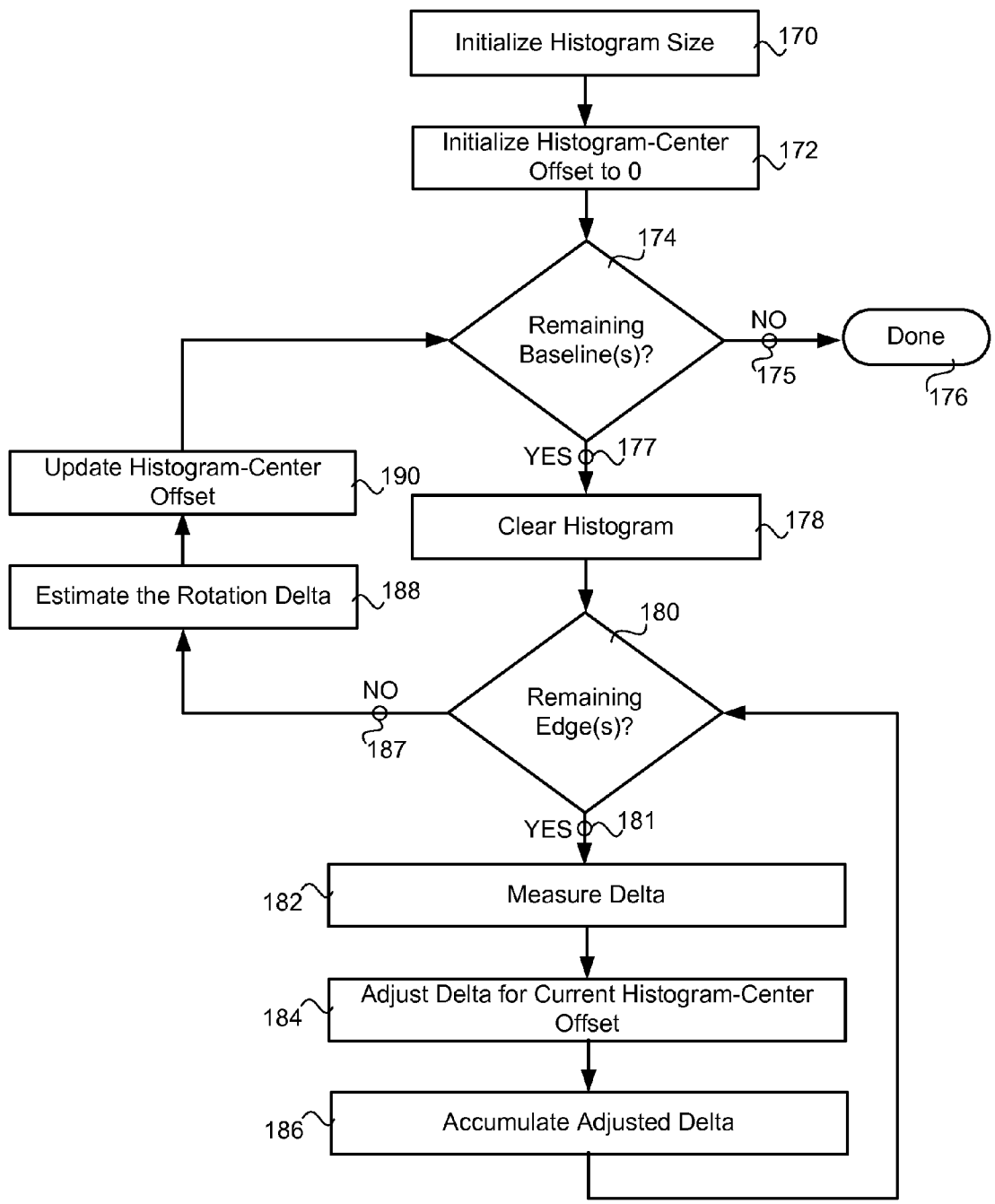
FIG. 10 is a chart showing exemplary embodiments of the present invention comprising a constrained-histogram generator.

The edge buffers 150 may be made available to the constrained-histogram generator 152. Some embodiments of the constrained-histogram generator 152 may be understood in relation to FIG. 10. For each baseline length, also referred to as a baseline, $\beta_i$, in an estimating set of baseline lengths $B=[\beta_1, \beta_2, \ldots, \beta_N]$, a histogram, of delta values for each edge in an edge buffer, may be generated. In an exemplary embodiment of the present invention, the set of baselines may be $B=[32,64,128,256,512,576]$, which allows for the resolution of angles as small as 0.1°.

A fixed histogram size may be selected and used for each baseline iteration. In some embodiments of the present invention, a common memory may be used for the fixed-size delta histogram for each baseline iteration. In some embodiments, the delta histogram may comprise $2\beta_1+1$ bins, where $\beta_1$ is the length of the shortest, or first, baseline and the bins may be mapped to the closed integer interval $[-\beta_1, \beta_1]$. In these embodiments, the first iteration may cover the estimation interval $[-45°, 45°]$.

The histogram size may be initialized 170, and a histogram-center offset may be initialized 172 to zero. A determination 174 may be made as to whether or not there are remaining baseline lengths to process. If all baselines in the baseline set have been processed 175, then the constrained-histogram generation process may terminate 176, and the most recent estimate of the rotation delta may be used to determine the rotation vector.

If there is a baseline in the baseline set that has not been processed 177, then the histogram may be cleared 178 and a constrained histogram associated with the next baseline length, considered the current baseline, in the baseline set may be generated. Clearing 178 the histogram may comprise, in some embodiments, setting the accumulation count in each bin to zero.

A determination 180 may be made as to whether or not there are remaining edges, in the edge buffers, to process at the current baseline length. If there are 181 remaining edges, a delta value associated with the current baseline may be measured 182. The delta value may be measured as described in relation to the embodiments described in relation to FIG. 1. The measured delta may be adjusted 184 based on the current histogram-center offset. Initially, the histogram center may be set to zero, thereby requiring no adjustment. After each baseline iteration, the histogram-center offset for the next baseline iteration may be updated 190 according the estimated rotation delta from the current iteration. Thus, an adjusted delta, which may be denoted $\Delta_{adjusted}$ may be determined from a measured delta, which may be denoted $\Delta_{measured}$, measured according to:

$$\Delta_{adjusted}=\Delta_{measured}-\text{CenterOffset},$$

where CenterOffset denotes the current histogram-center offset value. Therefore, fixing the histogram size and adjusting the histogram center effectuates a constrained window of delta values with progressively increasing baseline lengths. The adjusted delta value is accumulated 186 in the delta histogram associated with the current baseline length, and a determination 180 is made as to whether or not there are remaining edges in the edge buffers to process.

When all edges in the edge buffers have been processed 187 at the current baseline, then a rotation delta may be estimated 188 for the current iteration. In some embodiments of the present invention, the rotation delta may be estimated by finding the global histogram mode, mapping the mode index through a list of bin centers and adjusting for the center offset. The histogram-center offset may be updated 190, for the next iteration, to the estimated rotation delta. Thus, the rotation vector for the current iteration may be given by $[\beta_i, \Delta_i]$, where $\Delta_i$=bincenters$_i$(lb$_i$+mdindex$_i$−1) and bincenters$_i$ maps the histogram bin centers to displacement values.

A determination 174 may then be made as to whether or not there are remaining baselines to process.

Figure 11:
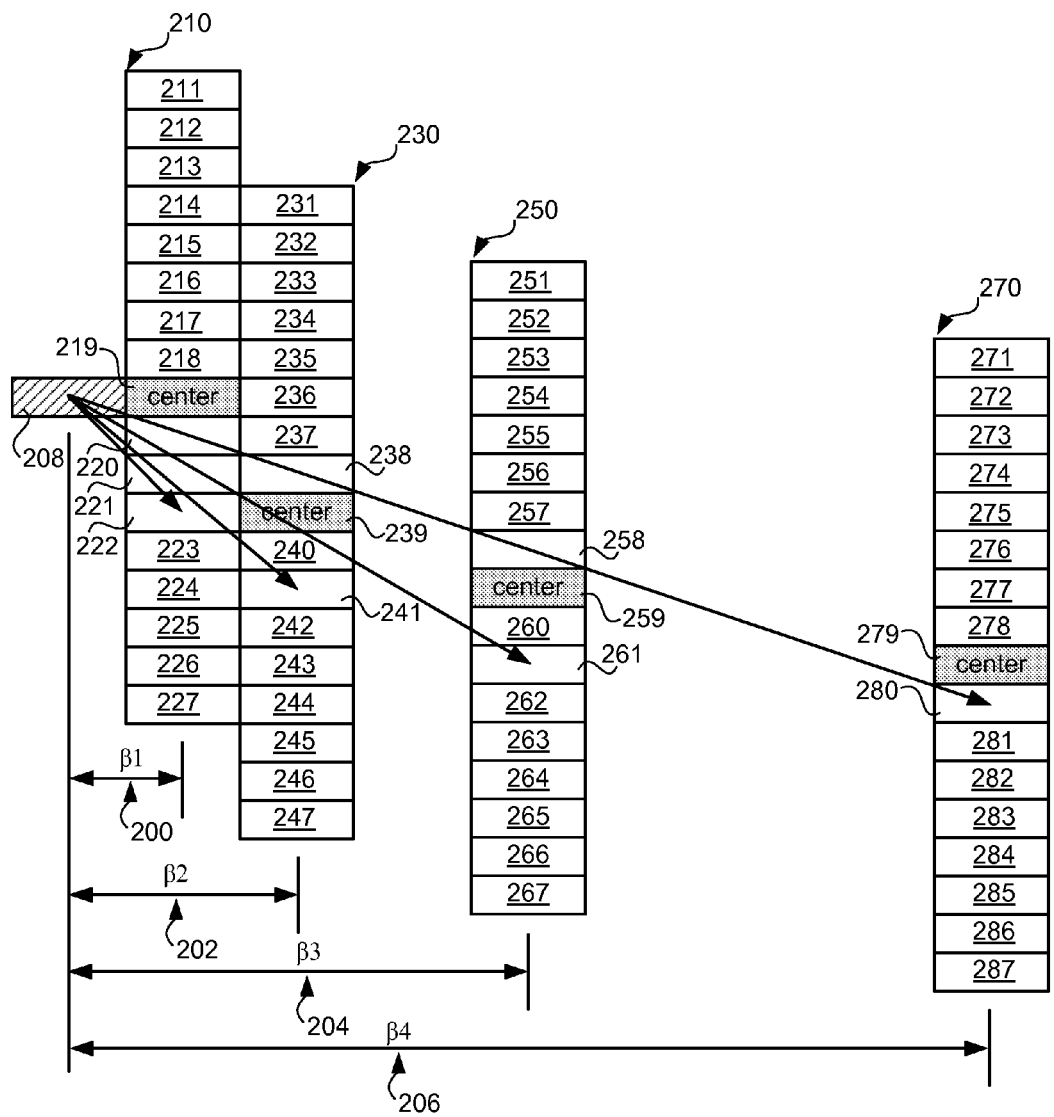
FIG. 11 is a picture illustrating an exemplary fixed-size histogram at multiple baseline iterations according to embodiments of the present invention.

Embodiments of the present invention wherein a vertical-edge buffer and a horizontal-edge buffer may be processed directly may be further understood in relation to an example depicted in FIG. 11. FIG. 11 depicts a fixed-size delta histogram 210 associated with a first baseline 200 of length $\beta_1$=8. The delta histogram 210 has 17 bins 211-227 associated with delta values in the integer interval [−8, 8] and corresponding to rotation angles in the interval $$\left[\tan^{-1}\left(\frac{-8}{8}\right), \tan^{-1}\left(\frac{8}{8}\right)\right] = [-45°, 45°].$$

The precision of a rotation angle estimate at this iteration is less than 7.125°. FIG. 11 shows an edge point 208 for illustration. At the first baseline iteration, a delta at the baseline offset $\beta_1$=8 will be accumulated in the delta histogram 210 at the bin, for example, bin 222, relative to the histogram-center offset, which is zero for the first iteration.

If the rotation delta estimate from the first baseline iteration is the rotation delta associated with bin 222, then the delta histogram 230 associated with a second baseline 202 of length $\beta_2$=16 is centered 239 around that delta offset determined from the first baseline iteration. Thus, the delta histogram 230 has 17 bins 231-247 associated with delta values in the integer interval [−2, 14] and corresponding to rotation angles in the interval $$\left[\tan^{-1}\left(\frac{-2}{16}\right), \tan^{-1}\left(\frac{14}{16}\right)\right] = [-7.1°, 41.2°].$$

If the rotation delta estimate from the second baseline iteration is the rotation delta associated with bin 241, then the delta histogram 250 associated with a third baseline 204 of length $\beta_3$=32 is centered 259 around that delta offset determined from the second baseline iteration. Thus, the delta histogram 250 has 17 bins 251-267 associated with delta values in the integer interval [8, 24] and corresponding to rotation angles in the interval $$\left[\tan^{-1}\left(\frac{8}{32}\right), \tan^{-1}\left(\frac{24}{32}\right)\right] = [14.0°, 36.9°].$$

If the rotation delta estimate from the third baseline iteration is the rotation delta associated with bin 261, then the delta histogram 270 associated with a fourth baseline 206 of length $\beta_4$=64 is centered 279 around that delta offset determined from the third baseline iteration. Thus, the delta histogram 270 has 17 bins 271-287 associated with the delta values in the integer interval [28, 44] and corresponding to rotation angles in the interval $$\left[\tan^{-1}\left(\frac{28}{64}\right), \tan^{-1}\left(\frac{44}{64}\right)\right] = [23.6°, 34.5°].$$

If the fourth baseline is the last baseline in the baseline set and the rotation delta estimate from the fourth baseline iteration is the rotation delta associated with bin 280, then the rotation vector is [64, 37] corresponding to a rotation angle of 30.0°.

Table 1 summarizes the constrained histogram bin mappings for this example.

TABLE 1

Progressively constrained histogramming for the example shown in FIG. 11

| Histogram Bin | $\beta_1 = 8$ rotation angle | $\beta_2 = 16$ rotation angle | $\beta_3 = 32$ rotation angle | $\beta_4 = 64$ rotation angle |
|---|---|---|---|---|
| −8 | $\tan^{-1}\left(\frac{-8}{8}\right) = -45°$ | $\tan^{-1}\left(\frac{-2}{16}\right) = -7.1°$ | $\tan^{-1}\left(\frac{8}{32}\right) = 14.0°$ | $\tan^{-1}\left(\frac{28}{64}\right) = 23.6°$ |
| −7 | $\tan^{-1}\left(\frac{-7}{8}\right) = -41.2°$ | $\tan^{-1}\left(\frac{-1}{16}\right) = -3.6°$ | $\tan^{-1}\left(\frac{9}{32}\right) = 15.7°$ | $\tan^{-1}\left(\frac{29}{64}\right) = 24.4°$ |
| −6 | $\tan^{-1}\left(\frac{-6}{8}\right) = -36.9°$ | $\tan^{-1}\left(\frac{0}{16}\right) = 0°$ | $\tan^{-1}\left(\frac{10}{32}\right) = 17.4°$ | $\tan^{-1}\left(\frac{30}{64}\right) = 25.1°$ |
| −5 | $\tan^{-1}\left(\frac{-5}{8}\right) = -32.0°$ | $\tan^{-1}\left(\frac{1}{16}\right) = 3.6°$ | $\tan^{-1}\left(\frac{11}{32}\right) = 19.0°$ | $\tan^{-1}\left(\frac{31}{64}\right) = 25.8°$ |
| −4 | $\tan^{-1}\left(\frac{-4}{8}\right) = -26.6°$ | $\tan^{-1}\left(\frac{2}{16}\right) = 7.1°$ | $\tan^{-1}\left(\frac{12}{32}\right) = 20.6°$ | $\tan^{-1}\left(\frac{32}{64}\right) = 26.6°$ |
| −3 | $\tan^{-1}\left(\frac{-3}{8}\right) = -20.6°$ | $\tan^{-1}\left(\frac{3}{16}\right) = 10.6°$ | $\tan^{-1}\left(\frac{13}{32}\right) = 22.1°$ | $\tan^{-1}\left(\frac{33}{64}\right) = 27.3°$ |
| −2 | $\tan^{-1}\left(\frac{-2}{8}\right) = -14.0°$ | $\tan^{-1}\left(\frac{4}{16}\right) = 14.0°$ | $\tan^{-1}\left(\frac{14}{32}\right) = 23.6°$ | $\tan^{-1}\left(\frac{34}{64}\right) = 28.0°$ |

TABLE 1-continued

Progressively constrained histogramming for the example shown in FIG. 11

| Histogram Bin | $\beta_1 = 8$ rotation angle | $\beta_2 = 16$ rotation angle | $\beta_3 = 32$ rotation angle | $\beta_4 = 64$ rotation angle |
|---|---|---|---|---|
| −1 | $\tan^{-1}\left(\frac{-1}{8}\right) = -7.1°$ | $\tan^{-1}\left(\frac{5}{16}\right) = 17.4°$ | $\tan^{-1}\left(\frac{15}{32}\right) = 25.1°$ | $\tan^{-1}\left(\frac{35}{64}\right) = 28.7°$ |
| 0 | $\tan^{-1}\left(\frac{0}{8}\right) = 0°$ | $\tan^{-1}\left(\frac{6}{16}\right) = 20.6°$ | $\tan^{-1}\left(\frac{16}{32}\right) = 26.6°$ | $\tan^{-1}\left(\frac{36}{64}\right) = 29.4°$ |
| 1 | $\tan^{-1}\left(\frac{1}{8}\right) = 7.1°$ | $\tan^{-1}\left(\frac{7}{16}\right) = 23.6°$ | $\tan^{-1}\left(\frac{17}{32}\right) = 28.0°$ | $\tan^{-1}\left(\frac{37}{64}\right) = 30.0°$ |
| 2 | $\tan^{-1}\left(\frac{2}{8}\right) = 14.0°$ | $\tan^{-1}\left(\frac{8}{16}\right) = 26.6°$ | $\tan^{-1}\left(\frac{18}{32}\right) = 29.4°$ | $\tan^{-1}\left(\frac{38}{64}\right) = 30.7°$ |
| 3 | $\tan^{-1}\left(\frac{3}{8}\right) = 20.6°$ | $\tan^{-1}\left(\frac{9}{16}\right) = 29.4°$ | $\tan^{-1}\left(\frac{19}{32}\right) = 30.7°$ | $\tan^{-1}\left(\frac{39}{64}\right) = 31.4°$ |
| 4 | $\tan^{-1}\left(\frac{4}{8}\right) = 26.6°$ | $\tan^{-1}\left(\frac{10}{16}\right) = 32.0°$ | $\tan^{-1}\left(\frac{20}{32}\right) = 32.0°$ | $\tan^{-1}\left(\frac{40}{64}\right) = 32.0°$ |
| 5 | $\tan^{-1}\left(\frac{5}{8}\right) = 32.0°$ | $\tan^{-1}\left(\frac{11}{16}\right) = 34.5°$ | $\tan^{-1}\left(\frac{21}{32}\right) = 33.3°$ | $\tan^{-1}\left(\frac{41}{64}\right) = 32.6°$ |
| 6 | $\tan^{-1}\left(\frac{6}{8}\right) = 36.9°$ | $\tan^{-1}\left(\frac{12}{16}\right) = 36.9°$ | $\tan^{-1}\left(\frac{22}{32}\right) = 34.5°$ | $\tan^{-1}\left(\frac{42}{64}\right) = 33.3°$ |
| 7 | $\tan^{-1}\left(\frac{7}{8}\right) = 41.2°$ | $\tan^{-1}\left(\frac{13}{16}\right) = 39.1°$ | $\tan^{-1}\left(\frac{23}{32}\right) = 35.7°$ | $\tan^{-1}\left(\frac{43}{64}\right) = 33.9°$ |
| 8 | $\tan^{-1}\left(\frac{8}{8}\right) = 45°$ | $\tan^{-1}\left(\frac{14}{16}\right) = 41.2°$ | $\tan^{-1}\left(\frac{24}{32}\right) = 36.9°$ | $\tan^{-1}\left(\frac{44}{64}\right) = 34.5°$ |

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A system for determining a skew angle associated with a scanned document page, said system comprising:
   a) an edge-buffer generator for generating, from a normalized image associated with a scanned document page, a vertical-edge buffer of vertical edges and a horizontal-edge buffer of horizontal edges; and
   b) a constrained-histogram generator for forming a plurality of constrained histograms, wherein said plurality of constrained histograms comprises:
      i) a first constrained histogram of deltas associated with said vertical edges and said horizontal edges at a first baseline length; and
      ii) a second constrained histogram of deltas associated with said vertical edges and said horizontal edges at a second baseline length, wherein:
         (1) said first baseline length is less than said second baseline length;
         (2) said first constrained histogram and said second constrained histogram are the same size; and
         (3) said second constrained histogram is centered around a first delta determined from said first constrained histogram.

2. A system as described in claim 1 further comprising:
   a) an image receiver for receiving an input image associated with said scanned document page; and
   b) an image preprocessor for generating said normalized image from said received input image.

3. A system as described in claim 2, wherein said image preprocessor comprises:
   a) a down-sampler; and
   b) a color-to-grayscale converter.

4. A system as described in claim 1, wherein said edge-buffer generator comprises:
   a) a vertical-strip summary-measure calculator for calculating a summary measure associated with each vertical strip in a plurality of vertical strips in said normalized image, thereby producing a vertical-strip buffer;
   b) a horizontal-strip summary-measure calculator for calculating a summary measure associated with each horizontal strip in a plurality of horizontal strips in said normalized image, thereby producing a horizontal-strip buffer;
   c) a vertical-edge detector for identifying a first plurality of edges in said vertical-strip buffer, thereby producing said vertical-edge buffer; and
   d) a horizontal-edge detector for identifying a second plurality of edges in said horizontal-strip buffer, thereby producing said horizontal-edge buffer.

5. A system as described in claim 1, wherein said first delta corresponds to a peak in said first histogram.

6. A system as described in claim 1, wherein said system resides in a device selected from the group consisting of an imaging device and a computing device.

7. A system as described in claim 1, wherein said first constrained histogram and said second constrained histogram are stored in the same memory locations.

\* \* \* \* \*